United States Patent [19]

Russer

[11] 3,835,398

[45] Sept. 10, 1974

[54] CLOCK PULSE REGENERATOR

[75] Inventor: Peter Russer, Senden/Iller, Germany

[73] Assignee: Licentia Patent-Verwaltungs-G.m.b.H, Frankfurt am Main, Germany

[22] Filed: Aug. 3, 1973

[21] Appl. No.: 385,238

[30] Foreign Application Priority Data

Aug. 3, 1972 Germany ............ 2238172

[52] U.S. Cl. ............ 328/164, 328/162, 328/160

[51] Int. Cl. ............ H03b 1/00

[58] Field of Search ............ 328/160, 162, 161, 164; 307/233

[56] References Cited

UNITED STATES PATENTS

| | | | |
|---|---|---|---|
| 3,383,465 | 5/1968 | Wilson | 328/164 |
| 3,475,556 | 10/1969 | Sasaki et al. | 328/164 |

*Primary Examiner*—Rudolph V. Rolinec
*Assistant Examiner*—B. P. Davis
*Attorney, Agent, or Firm*—Spencer & Kaye

[57] ABSTRACT

In a circuit for regenerating the clock pulses of a PCM signal and including a phase control loop composed of a phase detector, a first lowpass filter and a controlled oscillator producing a control voltage which is applied as a control voltage to the phase detector, the regeneration of clock pulses is improved by also providing a quotient former having a first input connected to the output of the low pass filter and an output connected to the oscillator, and a second low pass filter having the same transmission characteristic as the first low pass filter and connected between the signal input of the phase detector and a second input of the quotient former. These added components cooperate with the other components of the circuit to produce a regenerated clock pulse which is free of phase fluctuations due to frequency and amplitude fluctuations in the received signal.

1 Claim, 2 Drawing Figures

CLOCK PULSE REGENERATOR

BACKGROUND OF THE INVENTION

The present invention relates to a circuit for regenerating the clock pulse of a pulse code modulated (PCM) signal with the aid of a phase control loop formed of a phase detector, a lowpass filter and a controlled oscillator whose output voltage serves as the control voltage for the phase detector.

It is known that in order to regenerate and further process a PCM signal the clock pulse signal must be recovered. The received PCM signal contains interfering amplitude and phase noise and during the transmission of information there exists a random, or statistical distribution of bits.

SUMMARY OF THE INVENTION

It is an object of the present invention to reduce the above-mentioned phase fluctuations to a minimum, through use of a circuit having a given lock-in and holding range. Furthermore, it is intended that the statistical fluctuations of the pulse frequency and the pulse amplitude cause no additional phase fluctuations in the regenerated clock pulse signal.

This and other objects are accomplished according to the present invention in that a quotient former is inserted between the lowpass filter and the controlled oscillator of the phase control loop. The voltage at the input of the phase detector is fed to this quotient former through a further lowpass filter with the same transmission function.

DESCRIPTION OF THE PREFERRED EMBODIMENTS

Figures 1, 2:
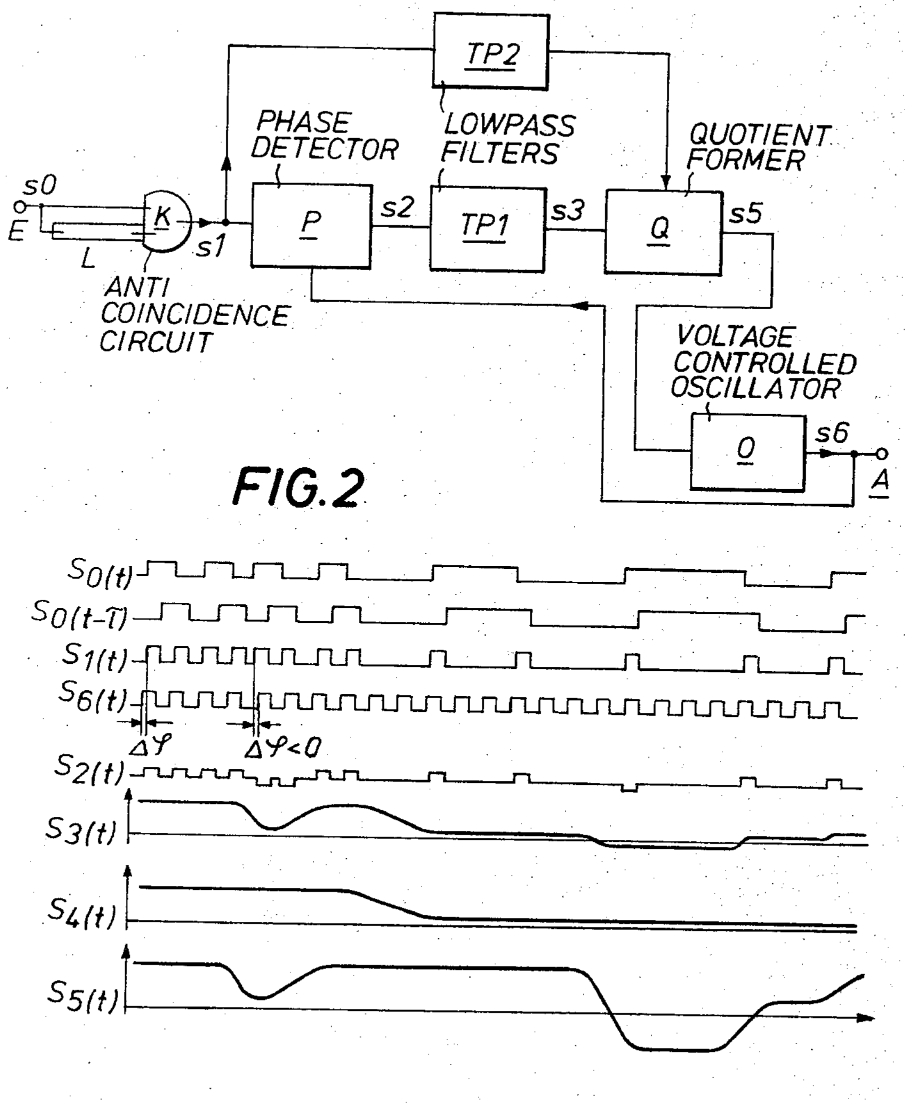
FIG. 1 is a block circuit diagram of a preferred embodiment of the invention.
FIG. 2 shows the time dependend of the signals in the circuit of FIG. 1.

The circuit according to the invention serves to regenerate a PCM signal which may be present either in the so-called NRZ form, where it does not return to a zero value, or in the so-called RZ form, where it does return to a zero value. If a PCM Signal is present in the NRZ form, this signal, *s*0, appears at the input E of the circuit and is delivered directly to one input of an anticoincidence circuit K. At the same time, the signal *s*0 is delayed in a line L and the delayed signal is supplied to a second input of the anticoincidence circuit K. The thus obtained output signal *s*1 contains one pulse for each 0–1 transition and for each 1–0 transition of the input signal *s*0, the delay of line L being appropriately selected. Signal *s*1 is fed to a phase detector P. The delay $\tau$ provided by the line L is half of the period of the clock pulse to be regenerated.

If the PCM signal is present in RZ form it can be fed directly to the phase detector P, i.e. *s*0=*s*1.

The output signal *s*2 of the phase detector P leads to a lowpass filter TP1 which transmits its output signal *s*3 to a quotient former Q. The output signal *s*5 of the quotient former controls the frequency of a series-connected voltage-controlled oscillator O. The output voltage *s*6 of this controlled oscillator may be obtained at the output terminal A. The output voltage signal *s*6 from the controlled oscillator O is conducted to a second input of phase detector P, where it is mixed with signal *s*1. The average of the output signal *s*2 of the phase detector P is proportional to the phase difference of the two signals *s*1 and *s*6 and amplitude and frequency of the pulses of signal *s*1. If necessary, the dependence on the pulse amplitude may be eliminated by a limiter stage ahead of the phase control loop.

In the operation of the circuit, the signal *s*2 travels from phase detector P to lowpass filter TP1, which performs the function usually perfomed in a phase control loop of the second order. In the subsequent quotient former Q the output signal *s*3 coming from lowpass filter TP1 is divided by a signal *s*4. This signal is derived from signal *s*1 in a further lowpass filter TP2, the output signal *s*4 from this lowpass filter TP2 being fed to quotient former Q.

It can be seen that if the two lowpass filters TP1 and TP2 have the same transmission characteristic, the output signal *s*5 from the quotient former Q becomes dependent only on the phase difference between signals *s*1 and *s*6. The quotient former Q is a so-called two quadrant analog divider which processes signal *s*3 with a positive and negative sign and signal *s*4 only with a positive sign. The signal *s*6 from oscillator O which can be obtained at output A is then the regenerated clock pulse signal.

For a second order phase-locked loop the filters TP1 and TP2 will have the transfer functions $$F_{i(p)} = [p\tau_{2i}+1]/[p(\tau_{1i}+\tau_{2i})+1] \quad (i=1,2) \qquad 1.$$

where $p$ is the complex frequency and $\tau_{1i}$, $\tau_{2i}$ are time constants. We denote the Laplace transforms with capital letters. $S_{3(p)}$ and $S_{4(p)}$ are connected with $S_{1(p)}$ and $S_{2(p)}$ by $$S_{3(p)} = F_{1(p)}\, S_{2(p)} \qquad 2.$$

$$S_{4(p)} = F_{2(p)}\, S_{1(p)} \qquad 3.$$

The output signal of the phase detector is $$s_{2(t)} = K_d\, \Delta\phi_{(t)} \cdot s_{1(t)} \qquad 4.$$

where $K_d$ is the phase detector gain factor and $$\Delta\phi_{(t)} = \phi_{1(t)} - 100_{\,2(t)} \qquad 5.$$

where $\phi_{1(t)}$ is the phase of the incoming signal $s_{1(t)}$ and $\phi_{6(t)}$ the phase of the regenerated clock signal.

The output signal of the quotient former $s_{5(t)}$ is given by $$s_{5(t)} = K_q\, [s_{3(t)}/s_{4(t)}] \qquad 6.$$

where $K_q$ is also a gain factor.

From equations (2), (3), (4) and (6) we get $$s_{5(t)} = K_q K_d \frac{\int_0^t f_1(t-\tau)\Delta\phi(\tau)s_1(\tau)d\tau}{\int_0^t f_2(t-\tau)s_1(\tau)d\tau} \qquad (7)$$

where we have used the correspondence of a product in the frequency domain to the convolution in the time domain. If the low pass filters TP1 and TP2 are identical, we have $$F_{1(p)} = F_{2(p)}$$

and the influence of $s_{1(t)}$ on $s_{5(t)}$ is a minimum. The proof of this statement can easily be made by a small signal analysis of equation (7).

Compared to the known circuits in which all arriving pulses are fed to a conventional phase control loop without a quotient former, the circuit according to the present invention has the advantage that the control signal does not depend on the pulse frequency or on the pulse amplitude. Additional phase fluctuations due to fluctuations in the pulse frequency and amplitude of the input signal are thus eliminated. The bandwidth and attenuation of the control circuit have constant optimum values independent of the pulse frequency. The noise bandwidth of the circuit is constant and minimal.

It is also known to have only synchronous pulses with a constant time frequency fed through a gate circuit of the phase control loop. In contradistinction thereto, the circuit according to the present invention has the advantage that the suppression of the phase noise is better since all pulses are utilized. Moreover, the not insignificant efforts and circuitry required to filter the synchronous pulses out of the PCM signal are here not required.

It will be understood that the above description of the present invention is susceptible to various modifications, changes and adaptations, and the same are intended to be comprehended within the meaning and range of equivalents of the appended claims.

I claim:

1. In a circuit for regenerating the clock pulses of a PCM signal with the aid of a phase control loop including a phase detector receiving a signal to be regenerated at a first input thereof, a first lowpass filter connected in series with the detector, and a cotrolled oscillator whose output is connected to a second input of the phase detector so that the output voltage from the oscillator serves as the control voltage for the phase detector, the improvement comprising: a quotient former having a first input connected to said first lowpass filter and an output connected to said controlled oscillator; and a second lowpass filter having the same transmission characteristic as said first filter and having an input connected to the input of said phase detector and an output connected to a second input of said quotient former, whereby said quotient former receives the voltage at the first input of said detector and the output of said oscillator presents a regenerated signal which is free of phase fluctuations due to frequency and amplitude fluctuations in the signal applied to the input of said detector.

* * * * *